(12) United States Patent
Goto et al.

(10) Patent No.: US 6,484,120 B1
(45) Date of Patent: Nov. 19, 2002

(54) POSITION DETECTION DATA GENERATING METHOD AND APPARATUS BASED ON PHASE SHIFT PRINCIPLE

(75) Inventors: Atsutoshi Goto, Fuchu (JP); Kazuya Sakamoto, Hamura (JP); Nobuyuki Akatsu, Higashiyamato (JP)

(73) Assignee: Atsutoshi Goto, Tokyo (JP)

( * ) Notice: Subject to any disclaimer, the term of this patent is extended or adjusted under 35 U.S.C. 154(b) by 0 days.

(21) Appl. No.: 09/574,163

(22) Filed: May 18, 2000

(30) Foreign Application Priority Data

May 19, 1999 (JP) .......................................... 11-139242

(51) Int. Cl.$^7$ .............................................. G01C 17/00

(52) U.S. Cl. ............. 702/151; 324/207.11; 324/207.24; 324/207.25

(58) Field of Search ...................... 702/151; 324/207.11, 324/207.25, 207.24

(56) References Cited

U.S. PATENT DOCUMENTS 5,710,509 A 1/1998 Goto et al.
5,739,659 A * 4/1998 Ezuka ........................ 318/605
5,747,995 A * 5/1998 Spies ....................... 324/207.2

* cited by examiner

Primary Examiner—John S. Hilten
Assistant Examiner—Stephen J. Cherry
(74) Attorney, Agent, or Firm—Morrison & Foerster LLP

(57) ABSTRACT

First A.C. output signal $\sin(\omega+\theta)$ having an electric phase angle shifted in a positive direction in accordance with a position-to-be-detected is produced along with a second A.C. output signal $\sin(\omega-\theta)$ having an electric phase angle shifted in a negative direction. First and second detection data are generated by detecting respective phase differences ($+\theta$ and $-\theta$) of the first and second A.C. output signals from a predetermined reference phase. First predicted value is provided on the basis of at least two successive samples of the first detection data, and a second predicted value is provided on the basis of at least two successive samples of the second detection data. The first and second predicted values are modified to provide a standard predicted value for correcting a nonlinear error resulting from the Doppler effect. Using this standard predicted value, predictive interpolation is performed on the first and second detection data sequentially with the passage of time, so as to provide first and second interpolated detection data. With this arrangement, it is possible to achieve improved response and detection performance with respect to dynamic characteristics. Error due to a temperature change or the like may be eliminated by performing an arithmetic operation on the first and second interpolated detection data, so that temperature drift characteristics can be improved.

9 Claims, 6 Drawing Sheets

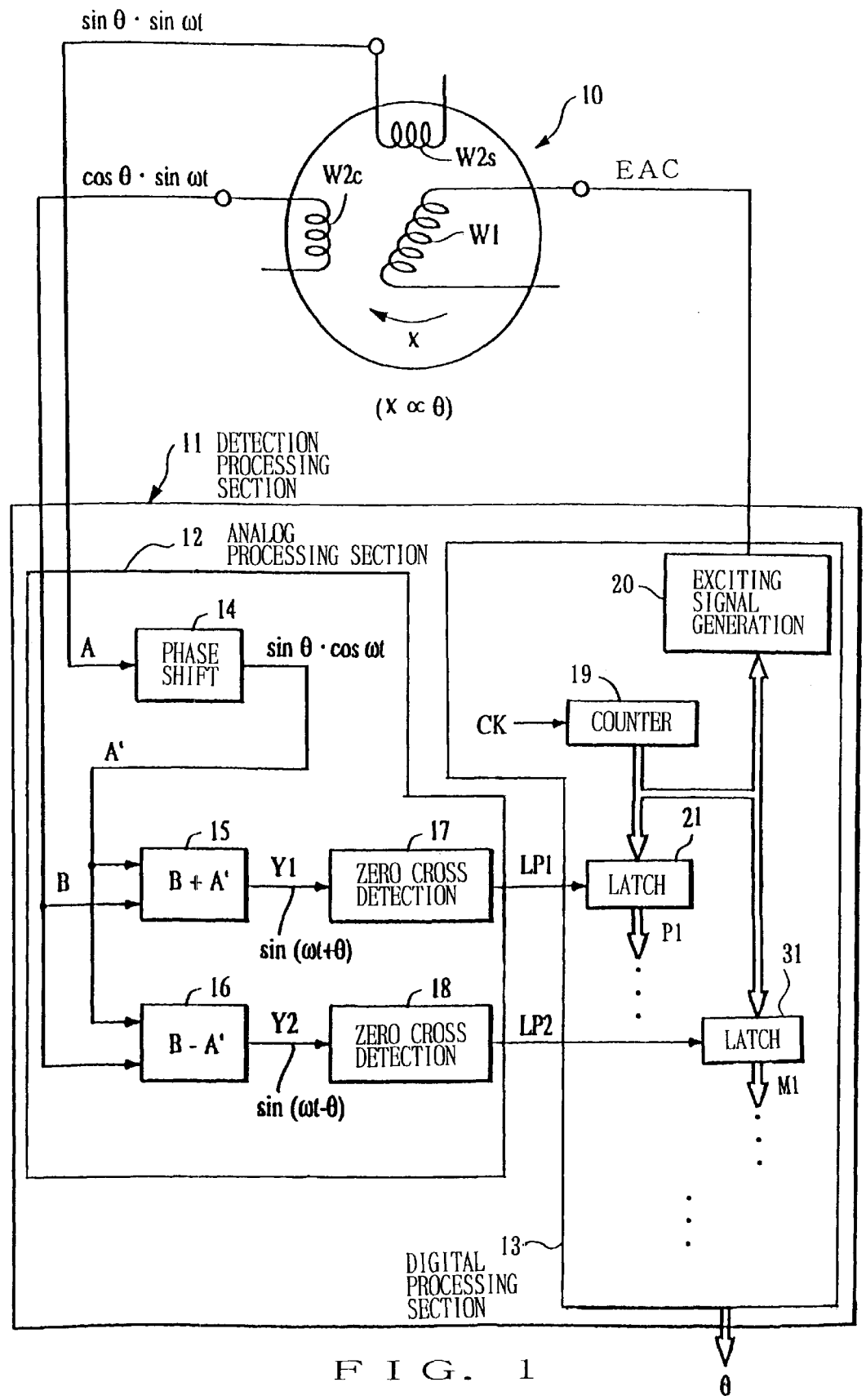
F I G. 1

US 6,484,120 B1

POSITION DETECTION DATA GENERATING METHOD AND APPARATUS BASED ON PHASE SHIFT PRINCIPLE

BACKGROUND OF THE INVENTION

The present invention relates to a position detection data generating method and apparatus for use in a position detection system which generates a first A.C. output signal having an electrical phase angle shifted in a phase-advancing or positive direction in accordance with a position of an object of detection and a second A.C. output signal having an electrical phase angle shifted in a phase-retreating or negative direction. More particularly, the present invention relates to a technique intended to improve detection performance with respect to dynamic characteristics of an object of detection (i.e., detecting characteristics when the object of detection is changing in position with time); for example, the present invention concerns a technique of detecting a rotational or linear position of an object of detection, such as a rotational position detector like a resolver or synchro or a linear position detector based on: a position detecting principle similar to that of the rotational position detector.

Induction-type rotational position detector apparatus of the type which produces two-phase outputs (i.e., outputs of sine and cosine phases) in response to a single-phase exciting input are commonly known as "resolvers", and induction-type rotational position detector apparatus of the type which produces three-phase outputs (i.e., outputs of three phases shifted from each other by 120°) in response to a single-phase exciting input are commonly known as "synchros". In the resolvers of the most traditional type, a stator includes two-pole (sine and cosine poles) secondary windings that intersect each other at a 90° mechanical angle, and a rotor includes a primary winding (the relationship between the primary and secondary windings may be reversed). The resolvers of this type are not satisfactory in that they need a brush to electrically contact the primary winding of the rotor. There have also been known brush-less resolvers that require no such brush; that is, these brush-less resolvers include, on the rotor side, a rotary transformer in place of the brush. The assignee of the instant application has recently developed an apparatus which, using a variable-reluctance-type detector having windings provided only on the stator (or the rotor), generates two-phase outputs (sine-phase and cosine-phase outputs) in response to a single-phase exciting input. The position detector apparatus which produce two-phase outputs (i.e., outputs of sine and cosine phases) in response to a single-phase exciting input as mentioned above have been proposed not only for the rotary position detection but also for the linear position detection.

The assignee of the instant application also proposed, in U.S. Pat. No. 5,710,509 (corresponding to Japanese Patent Laid-open Publication No. HEI-9-126809), a novel phase difference detection technique suitably applicable to the so-called resolver-type position detector apparatus producing two-phase outputs in response to a single-phase exciting input. This proposed phase difference detection technique gives a solution to the problem that A.C. signals induced in secondary windings would vary subtly in electric phase, in response to an ambient temperature change, to cause a detection error because the windings (coils) of the position detector apparatus vary in their impedance due to the ambient temperature change. The proposed phase difference detection technique generally comprises the following steps.

[Step 1] In response to a single-phase exciting input, the resolver-type position detector apparatus produces two A.C. output signals $\sin\theta \sin\omega t$ and $\cos\theta \sin\omega t$ having been amplitude-modulated by a sine function $\sin\theta$ and cosine function $\cos\theta$, respectively, corresponding to a phase angle $\theta$ of a position of an object to be detected (hereinafter, also referred to as a "position-to-be-detected"). These A.C. output signals $\sin\theta \sin\omega t$ and $\cos\theta \sin\omega t$ are processed electrically to generate a first A.C. output signal $\sin(\omega t+\theta)$ having an electric phase angle $(+\theta)$ shifted in the phase-advancing or positive direction in accordance with the position-to-be-detected and a second A.C. output signal $\sin(\omega t-\theta)$ having an electric phase angle $(-\theta)$ shifted in the phase-retreating or negative direction in accordance with the position-to-be-detected. If a phase error component caused by a winding impedance variation due to an ambient temperature change is represented by "±d", then the above-mentioned A.C. output signals can be expressed by $\sin(\omega t\pm d+\theta)$ and $\sin(\omega t\pm d-\theta)$, respectively.

[Step 2] Phase differences $(\pm d+\theta$ and $\pm d-\theta)$ of the A.C. output signals from a predetermined reference phase (e.g., zero phase of $\sin\omega t$) are detected, using a known digital phase difference measuring technique such as the "zero cross latch" scheme, to thereby obtain respective phase detection data.

[Step 3] Arithmetic operation of "$\{(\pm d+\theta)+(\pm d-\theta)\}\div 2=\pm d$" is performed using the thus-obtained phase detection data, to thereby calculate error data $\pm d$.

[Step 4] Error-free phase detection data $\theta$ is obtained by subtracting the error data $\pm d$ from one of the phase detection data (e.g., $\pm d+\theta$).

When the position-to-be-detected varies over time, the phase angle $\theta$ corresponding thereto would also vary over time, although no significant problem occurs when the position-to-be-detected is not moving. In such a case, the phase difference amount $\theta$ of the A.C. output signals $\sin(\omega t\pm d+\theta)$ and $\sin(\omega t\pm d-\theta)$ would present, rather than a constant value, dynamic characteristics time-varying in correspondence with a moving speed of the object of detection. If the time-varying dynamic characteristics are represented collectively by $\theta(t)$, then the A.C. output signals can be expressed by $\sin\{\omega t\pm d+\theta(t)\}$ and $\sin\{\omega t\pm d-\theta(t)\}$, respectively. Namely, by the well-known Doppler effect, the leading-phase A.C. output signal shifts to a higher frequency in accordance with the dynamic characteristics $+\theta(t)$, while the trailing-phase A.C. output signal shifts to a lower frequency in accordance with the dynamic characteristics $-\theta(t)$. Namely, with the dynamic characteristics, the cycles of the two A.C. output signals sequentially shift in the opposite directions per cycle of the reference signal $\sin\omega t$, which would make it difficult to accurately calculate the phase variation error $\pm d$ by only performing the arithmetic operation of Step 3 above.

Thus, to provide a good solution to such an inconvenience, the above-discussed prior phase difference detection technique is arranged to detect when there occurs a coincidence in zero cross between the two A.C. output signals $\sin\{\omega t\pm d+\theta(t)\}$ and $\sin\{\omega t\pm d-\theta(t)\}$. More specifically, each time such a coincidence in zero cross between the two A.C. output signals is detected, the phase detection data of either one of the A.C. output signals $\sin\{\omega t\pm d+\theta(t)\}$ and $\sin\{\omega t\pm d-\theta(t)\}$ relative to the predetermined reference A.C. signal $\sin\omega t$ is held as the error data $\pm d$, and then the position detection data is modified at Step 4 above using the thus-held error data.

However, because the phase detection data can be obtained only when the zero crosses of the A.C. output signals $\sin(\omega t+\theta) \sin(\omega t-\theta)$ coincide with each other, the above-discussed prior phase difference detection technique faces the serious problem that the timewise detecting resolution of the phase detection data is limited to just one cyclic period of the A.C. signals and thus the response performance with respect to the dynamic characteristics (i.e., detecting characteristics when the position-to-be-detected is changing over time) is limited to a significant degree. Further, the response capability can be even further degraded because the detection of the error data id taking the dynamic characteristics into account requires waiting for time points when a coincidence in zero cross occurs between the two A.C. output signals.

SUMMARY OF THE INVENTION

It is therefore an object of the present invention to provide a position detection data generating method and apparatus which achieve an improved response capability and detecting performance with respect to dynamic characteristics when applied to a position detecting system that produces a first A.C. output signal having an electric phase angle shifted in a positive direction in accordance with a position of an object of detection and a second A.C. output signal having an electric phase angle shifted in a negative direction in accordance with the position of the object of detection.

In order to accomplish the above-mentioned object, the present invention provides a position detection data generating method for use in a position detection system that produces a first A.C. output signal having an electric phase angle shifted in a positive direction in accordance with a position-to-be-detected and a second A.C. output signal having an electric phase angle shifted in a negative direction, which method comprises: a first step of generating first detection data by detecting a phase difference of the first A.C. output signal from a predetermined reference phase and generating second detection data by detecting a phase difference of the second A.C. output signal from the predetermined reference phase; a second step of providing a first predicted value on the basis of at least two samples of the first detection data and providing a second predicted value on the basis of at least two samples of the second detection data; a third step of providing at least one standard predicted value on the basis of the first and second predicted values; a fourth step of performing interpolation on the first detection data and the second detection data, sequentially with passage of time, using the standard predicted value, to thereby provide first interpolated detection data and second interpolated detection data; and a fifth step of, on the basis of the first and second interpolated detection data, outputting position detection data corresponding to the position-to-be-detected.

In one preferred implementation, the above-mentioned fifth step includes a step of obtaining error data contained in the first and second detection data by performing an arithmetic operation between the first and second interpolated detection data provided by the fourth step, and a step of providing interpolated position detection data indicative of the position-to-be-detected by performing an arithmetic operation to remove the error data from one of the first and second interpolated detection data.

The present invention can improve its response performance with respect to dynamic characteristics (detecting characteristics when the position-to-be-detected is changing over time) by generating the first and second interpolated detection data, densely at close time intervals, through the predictive interpolation operation. Thus, the timewise density or precision of -the first and second interpolated detection data can be increased significantly, which allows the error data to be calculated whenever necessary by the fifth step and which therefore can eliminate the need to wait for a time point where a coincidence in zero cross occurs between the two A.C. output signals as in the conventionally-known techniques; therefore, the present invention achieves an improved response capability or responsivity. Further, with the arrangement that at least one standard predicted value is determined by the third step on the basis of the first and second predicted values, the present invention can appropriately correct an error that is likely to occur in the interpolating arithmetic operation due to a possible difference in linearity of frequency transition (cyclic period transition) caused by the Doppler effect between the signals phase-shifted in the positive and negative directions. As a consequence, the present invention can perform the interpolating arithmetic operation with increased accuracy.

The present invention also provides a position detection data generating method for use in a position detection system that produces a first A.C. output signal having an electric phase angle shifted in a positive direction in accordance with a position-to-be-detected and a second A.C. output signal having an electric phase angle shifted in a negative direction, which method comprises: a first step of generating first detection data by detecting a phase difference of the first A.C. output signal from a predetermined reference phase and generating second detection data by detecting a phase difference of the second A.C. output signal from the predetermined reference phase; a second step of providing first interpolated output data by performing predictive interpolation, using at least two samples of the first detection data, sequentially with passage of time and at time intervals of interpolation steps each shorter than an A.C. period of the reference phase; a third step of providing second interpolated output data by performing predictive interpolation, using at least two samples of the second detection data, at the time intervals of interpolation steps; a fourth step of obtaining error data contained in the first and second detection data by performing an arithmetic operation between the first and second interpolated output data provided by the second and third steps; and a fifth step of providing interpolated position detection data indicative of the position-to-be-detected by performing an arithmetic operation to remove the error data from one of the first and second interpolated output data. With this method too, the response performance with respect to dynamic characteristics can be significantly improved by generating the first and second interpolated detection data, densely at close time intervals, through the predictive interpolation. Thus, the timewise density or precision of the first and second interpolated detection data can be increased, which allows the error data to be calculated whenever necessary by the fourth step and which therefore can eliminate the need to wait for a time point where a coincidence in zero cross occurs between the two A.C. output signals as in the conventionally-known techniques; as a consequence, the present invention achieves an improved response capability.

Further, the present invention provides a position detection data generating method for use in a position detection system which produces a first A.C. output signal having an electric phase angle shifted in a positive direction in accordance with a position-to-be-detected and a second A.C. output signal having an electric phase angle shifted in a negative direction, which comprises: a first step of generating first detection data by detecting a phase difference of the first A.C. output signal from a predetermined reference phase and generating second detection data by detecting a phase difference of the second A.C. output signal from the predetermined reference phase; a second step of providing interpolation data for performing predictive interpolation, using at least two samples of the first detection data and at least two samples of the second detection data, sequentially with passage of time and at time intervals of interpolation steps each shorter than an A.C. period of the reference phase; a third step of obtaining error data contained in the first and second detection data; and a fourth step of, for at least one of the first and second detection data, performing an arithmetic operation using the interpolation data and error data, to thereby provide interpolated position detection data corresponding to the one of the first and second detection data from which the error data has been removed and which has been subjected to predictive interpolation. With this method too, the response performance with respect to dynamic characteristics can be significantly improved by generating the first and second interpolated detection data, densely at close time intervals, through the predictive interpolation. Thus, the timewise density or precision of the first and second interpolated detection data can be increased, which allows the error data to be calculated whenever necessary by the third step and which therefore can eliminate the need to wait for a time point where a coincidence in zero cross occurs between the two A.C. output signals as in the conventionally-known techniques; as a consequence, the present invention achieves an improved response capability.

The present invention may be constructed and implemented not only as the method invention as set out above but also as a system or apparatus invention. The present invention may also be practiced as a program for execution by a processor such as a computer or DSP, or a storage medium storing such a program.

BRIEF DESCRIPTION OF THE DRAWINGS

For better understanding of the object and other features of the present invention, its preferred embodiments will be described in greater detail hereinbelow with reference to the accompanying drawings, in which:

FIG. 1 is a block diagram showing a general organization of a position detection system employing a position detection data generating method in accordance with a preferred embodiment of the present invention;

DETAILED DESCRIPTION OF THE PREFERRED EMBODIMENTS

Figure 2:
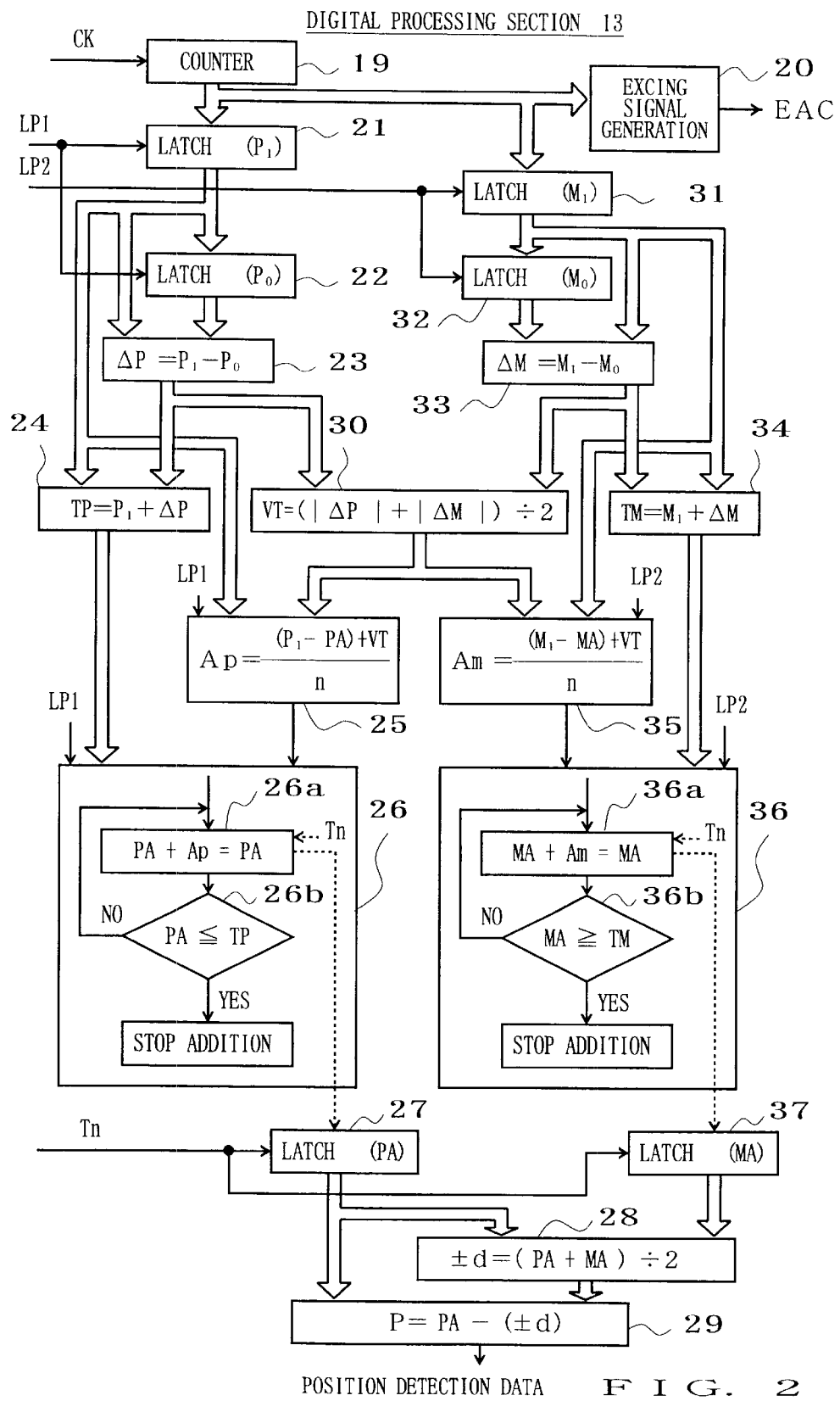
FIG. 2 is a block diagram showing an exemplary specific organization of a digital processing section shown in FIG. 1.

FIG. 1 is a block diagram showing a general organization of a position detection system employing a position detection data generating method in accordance with a preferred embodiment of the present invention. This position detection system generally comprises a position sensor 10 and a detection processing unit 11, and the detection processing unit 11 includes an analog processing section 12 and a digital processing section 13 as will be later described in detail. Various components characterizing the inventive position detection data generating method are contained in the digital processing section 13. For convenience of illustration, FIG. 1 shows only a part of the inner structure of the digital processing section 13, details of which are shown in FIG. 2.

The position sensor 10 and analog processing section 12 cooperate with each other to produce a first A.C. output signal (for convenience, denoted by "sin(ωt+θ)") having an electric phase angle (denoted by "+θ") shifted in a phase-advancing or positive direction in accordance with a position of an object of detection (i.e., a position-to-be-detected) and a second A.C. output signal (for convenience, denoted by "sin(ωt−θ)" having an electric phase angle ("−θ") shifted in a phase-retreating or negative direction in accordance with the position-to-be-detected. The position sensor 10 and analog processing section 12 may be constructed in any other manner than that shown in FIG. 1 as long as they can produce such two different A.C. output signals. The following paragraphs describe exemplary structural arrangements for producing the above-mentioned two different A.C. output signals.

The position sensor 10 may be of any type, such as a conventionally-known brushless or brush-equipped resolver. Alternatively, the position sensor 10 may be a variable-reluctance type position sensor where primary and secondary windings are provided on the stator with no winding provided on the rotor or movable member, and the position sensor 10 may be either a rotational position detecting sensor or linear position detecting sensor. A single-phase exciting A.C. signal EAC generated by the detection processing section 11 is applied to the position sensor 10 so as to excite the primary winding W1. In the position sensor 10, A.C. output signals are induced in the two-phase secondary windings W2s and W2c in response to excitation of the primary winding W1 by the single-phase exciting input, and the respective induced voltage levels of the signals present two-phase functional characteristics, sine and cos θ, in correspondence with a particular position of the object of detection (position-to-be-detected) x. That is, the induced output signals of the secondary windings W2s and W2c are output with their amplitudes modulated by the two-phase functional characteristics sin θ and cos θ corresponding to the position-to-be-detected x. For convenience of description, it is assumed herein that x=θ or x is proportional to θ. Further, for convenience of description, coefficients relating to other conditions such as the respective turns of the windings will not be taken into account here, and the secondary winding W2s is assumed to be of a sine phase with its output signal represented by "sin θ·sin ωt" whereas the other secondary winding W2c is assumed to be of a cosine phase with its output signal represented by "cos θ·sin ωt". That is, one of the secondary windings W2s outputs a first A.C. output signal A (=sin θ·sin ωt) having as its amplitude value a first function value sin θ corresponding to the position-to-be-detected x, and the other secondary winding W2c outputs a second A.C. output signal B (=cos θ·sin ωt) having as its amplitude value a second function value cos θ corresponding to the position-to-be-detected x.

In the detection processing section 11, a counter 19 counts predetermined high-speed clock pulses CK, an exciting signal generation circuit 20 generates an exciting A.C. signal on the basis of a counted value of the counter 19, and the generated exciting A.C. signal is supplied to the primary winding W1 of the position sensor 10. The modulus or modulo number of the counter 19 corresponds to one cycle of the exciting A.C. signal EAC, and it is assumed herein, for convenience of description, that a counted value "0" of the counter 19 corresponds to a zero phase of a predetermined reference A.C. signal sin ωt. Assuming that one complete cycle of the reference A.C. signal sin ωt from the zero to maximum phases is generated during one cycle of counting of the counter 19 from zero to maximum values, each exciting A.C. signal EAC is generated, by the exciting signal generation circuit 20, in correspondence with the reference A.C. signal sin ωt.

The first and second A.C. output signals A and B produced by the position sensor 10 are first supplied to the analog processing section 12 of the detection processing section 11. In the analog processing section 12, the first A.C. output signal A (=sin θ·sin ωt) is input to a phase shift circuit 14 so that it is shifted in electric phase by a predetermined amount (e.g., advanced by 90°) so as to provide a phase-shifted A.C. signal A' (=sin θ·cos ωt). The analog processing section 12 also includes adder and subtracter circuits 15 and 16. In the adder circuit 15, the phase-shifted A.C. signal A' (=sin θ·cos ωt) from the phase shift circuit 14 and the above-mentioned second A.C. output signal B (=cos θ·sin ωt) are added together so as to obtain, as an added output, a first electric A.C. signal Y1 that may be expressed by a brief formula of B+A'=cos θ·sin ωt+sin θ·cos ωt=sin(ωt+θ). On the other hand, in the subtracter circuit 16, a subtraction between the phase-shifted A.C. signal A' (=sin θ·cos ωt) from the phase shift circuit 14 and the above-mentioned second A.C. output signal B (=cos θ·sin ωt) is performed so as to obtain, as a subtracted output, a second electric A.C. signal Y2 that may be expressed by a brief formula of B−A'=cos θ·sin ωt−sin θ·cos ωt=sin(ωt−θ). In this way, there can be obtained, through the electric processing, the first electric A.C. signal Y1 (=sin(ωt+θ)) having its electric phase (+θ) shifted in the positive direction in correspondence to the position-to-be-detected x, and the second electric A.C. signal Y2 (=sin(ωt−θ)) having its electric phase (−θ) shifted in the negative direction in correspondence to the position-to-be-detected x.

The above-mentioned output signals Y1 and Y2 from the adder and subtracter circuits 15 and 16 are given to zero-cross detection circuits 17 and 18, for detection of the respective zero-cross points of the first and second signals Y1 and Y2. The zero-cross detection may be done by, for example, identifying a point where each of the signal Y1, Y2 changes from a negative polarity to a positive polarity, i.e., a zero phase point. Zero-cross detection pulses generated by the circuits 17 and 18 upon detection of the respective zero-cross points are applied as latch pulses LP1 and LP2 to the digital processing section 13 for purposes to be described below.

Exemplary details of the digital processing section 13 are shown in FIG. 2. In the digital processing section 13, the latch pulse LP1 corresponding to the electric phase shifted in the positive direction in correspondence to the position-to-be-detected x (i.e., the leading phase +θ) is used as a latch control signal for a latch (register) 21, while the latch pulse LP2 corresponding to the electric phase shifted in the negative direction in correspondence to the position-to-be-detected x (i.e., the trailing phase −θ) is used as a latch control signal for another latch (register) 31. Namely, each of the latches 21 and 31 latches a current count of the counter 19 at generation timing of the corresponding latch pulse LP1 or LP2. Because the modulo number of the counter 19 corresponds to one cycle of the exciting A.C. signal and the counted value "0" of the counter 19 corresponds to the zero phase of the predetermined reference A.C. signal sin ωt as previously noted, data $P_1$ and $M_1$ latched in the latches 21 and 31 correspond to the phase differences of the output signals Y1 and Y2 (+θ and −θ) from the reference A.C. signal sin ωt.

Thus, the operation for latching the data $P_1$ and $M_1$ in the latches 21 and 31 in response to the respective latch pulses LP1 and LP2 constitutes a process for generating first detection data $P_1$ by detecting a phase difference of the first A.C. output signal "sin(ωt+θ)" having its electric phase angle ("+θ") shifted in the positive direction in accordance with the position-to-be-detected x and generating second detection data $M_1$ by detecting a phase difference of the second A.C. output signal "sin(ωt−θ)" having its electric phase angle ("−θ") shifted in the negative direction in accordance with the position-to-be-detected x.

If a phase variation error of the output signal, which may result from influences of a length of a cable connecting between the position sensor 10 and the detection processing section 11 and impedance variations, due to an ambient temperature change, of the windings W1, W2s and W2c in the position sensor 10, is represented collectively by "±d", the above-mentioned A.C. detection signals Y1 and Y2 can be expressed as follows:

$$Y1 = \sin(\omega t \pm d + \theta)$$

$$Y2 = \sin(\omega t \pm d - \theta)$$

Figure 3A:
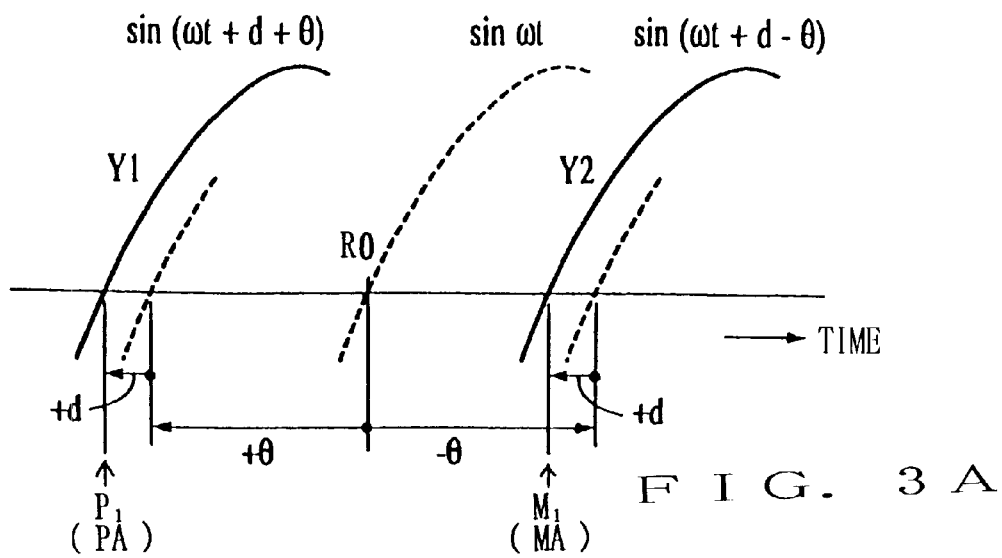
FIGS. 3A–3C are diagrams explanatory of typical behavior of the position detection system shown in FIG. 1.
Figure 3B:
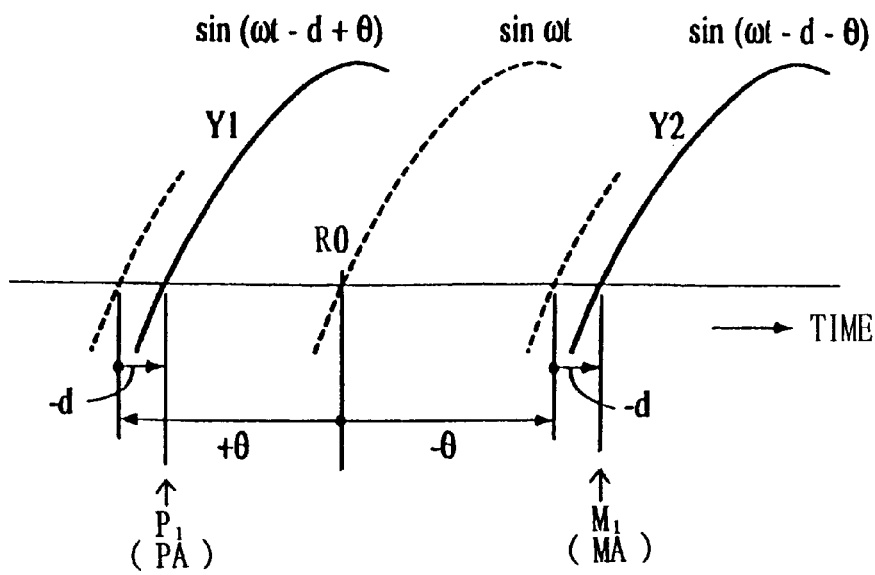

Namely, each of the detection data $P_1$ and $M_1$ would inevitably contain such an error ±d and thus does not indicates an actual phase angle corresponding exactly to the position-to-be-detected x; the error ±d is contained in each of the detection data $P_1$ and $M_1$ as an error in the same (phase) direction as illustratively shown in FIGS. 3A and 3B. Specifically, FIG. 3A shows an example where the phase error ±d is a positive phase error (+d), while FIG. 3B shows an example where the phase error ±d is a negative phase error (−d). More specifically, the detection data $P_1$ of the leading phase presents a phase difference of "±d+θ" from a reference phase R0 (e.g., the zero phase of the reference A.C. signal sin ωt), and the detection data $M_1$ of the trailing phase presents a phase difference of "±d−θ" from the reference phase R0. Although the error ±d is an unknown value, the above-discussed prior phase difference detection technique proposed by the assignee of the present application disclosed that the error ±d could be identified by adding together the two detection data $P_1$ and $M_1$ of the leading and trailing phases and dividing, by two, the sum of the detection data $P_1$ and $M_1$, i.e., using a mathematical expression of "{(±d+θ)+(±d−θ)}÷2=±d", and thereby a temperature characteristic error could be appropriately compensated for. Similar temperature characteristic error compensation is made in this embodiment, as will be later described in detail. Note that in the following description, the phase component of the A.C. detection signals will be denoted simply as "+θ" or "−θ" or "ωt+θ" or "ωt−θ" without considering the presence of such an error ±d.

It should also be appreciated that because each of the latches 21 and 31 latches the count of the same counter 19; thus, if the count of the counter 19 is regarded directly as an absolute value of the trailing phase −θ, the latch 21 for the leading phase +θ will latch phase data corresponding to a complement of 360° (i.e., "360°−θ"). This is equivalent to latching data, corresponding to the signed phase differences "+θ" and "−θ", in the latches 21 and 31 directly as the detection data $P_1$ and $M_1$. Because the detection data $P_1$ and $M_1$ are assumed to correspond to the signed phase differences "+θ" and "−θ" like this, dividing, by two, the sum of the two detection data $P_1$ and $M_1$ of the leading and trailing phases as above can correspond to detecting the error ±d. However, such arrangements is a matter of mere design choice and thus may be modified as desired. For example, the absolute value "θ" of the leading phase may be latched in the latch 21; for that purpose, the count of the counter 19 may be latched in the latch 31 directly, and a negative value of the count of the counter 19 or a complement of the count relative to the modulo number (a difference between the maximum count and the current count) may be latched in the other latch 21. In this case, the detection data $P_1$ pertaining to the leading phase "+θ" latched in the latch 21 represents the absolute value of the difference θ, and similarly the detection data $M_1$ pertaining to the trailing phase "−θ" latched in the latch 31 represents the absolute value of the difference θ. Also, in such a case, the error ±d can be identified by dividing, by two, a difference between the detection data $P_1$ indicative of the absolute value "θ±d" of the leading phase "±d+θ" containing the error "±d" and the detection data $M_1$ indicative of the absolute value "θ−(±d)" of the trailing phase "±d−θ" containing the error "±d". Details of the data format and arithmetic operations may be modified as appropriate.

Referring back to FIG. 2, secondary latches (i.e., registers) 22 and 32 are provided in corresponding relation to the primary latches 21 and 31. The output from the primary latch 21 is latched (i.e., shifted) into the corresponding secondary latch 22 in accordance with the latch pulse LP1, and the output from the primary latch 31 is latched (i.e., shifted) into the corresponding secondary latch 32 in accordance with the latch pulse LP2. Namely, the data latched in the latch 21 (or 31) at the generation timing of the preceding latch pulse LP1 (or LP2) (i.e., preceding sample of phase difference detection data immediately preceding the current sample) is transferred to the secondary latch 22 (or 32). Thus, if the data latched in the primary latch 21 (or 31) and then output therefrom in response to the currently generated latch pulse LP1 (or LP2) is assumed to be the current sample of the phase difference detection data $P_1$ (or $M_1$), then the data transferred to and output from the secondary latch 22 (or 32) at that time can be said to be the last or preceding sample of the phase difference detection data $P_0$ (or $M_0$) In this way, two successive samples $P_1$ and $P_0$ of the first detection data $P_1$ having a tendency to phase-shift in the positive direction, i.e., of the leading phase, are obtained from the primary and secondary latches 21 and 22. Similarly, two successive samples $M_1$ and $M_0$ of the second detection data $M_1$ having a tendency to phase-shift in the negative direction, i.e., of the trailing phase, are obtained from the primary and secondary latches 31 and 32.

Subtracter 23 subtracts the output value $P_0$ of the secondary latch 22 from the output value $P_1$ of the primary latch 21, to thereby determine a variation amount ΔP per sample cycle; that is, the subtracter 23 performs the arithmetic operation $$\Delta P = P_1 - P_0$$

Here, one sample cycle is one alternating cycle of the first A.C. output signal sin(ωt+θ), which corresponds to one cycle of the reference A.C. signal sin ωt when the position-to-be-detection is not moving or stationary but shifts in the positive direction (i.e., in a direction where the alternating period gets shorter) when the position-to-be-detection is moving. This is because the latch timing gets faster every sample cycle.

Similarly, a subtracter 33 subtracts the output value $M_0$ of the secondary latch 32 from the output value $M_1$ of the main latch 31, to thereby determine a variation amount ΔM per sample cycle; that is, the subtracter 23 performs the arithmetic operation $$\Delta M = M_1 - M_0$$

Figure 3C:
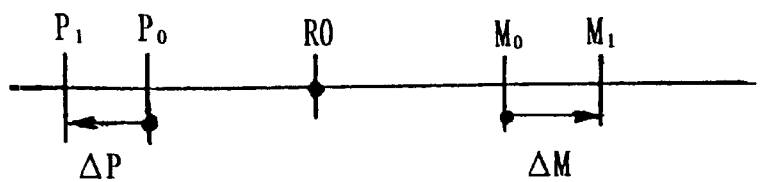

Here, one sample cycle is one alternating cycle of the second A.C. output signal sin(ωt−θ), which corresponds to one cycle of the reference A.C. signal sin ωt when the position-to-be-detection is not moving but shifts in the negative direction (i.e., in a direction where the alternating period gets longer) when the position-to-be-detection is moving. This is because the latch timing gets slower every sample cycle. FIG. 3C shows exemplary phase differences of various samples of the phase difference detection data $P_0$, $P_1$, $M_0$, $M_1$ from the reference phase R0 and thereby graphically illustrates the variation amounts ΔP and ΔM of the leading and trailing phases per sample cycle.

The variation amounts ΔP and ΔM in the different directions are used in subsequent interpolating arithmetic operations as predicted values of variation amounts till the respective next latch timing. For example, an adder 24 adds together the current sample of the detection data $P_1$ output from the latch 21 and the predicted variation amount ΔP to be used till the next sample timing output from the subtracter 23, to thereby obtain a target value TP for the interpolating arithmetic operations. Namely, the adder 24 performs the operation of $$TP = P_1 + \Delta P$$

Similarly, an adder 34 adds together the current sample of the detection data $M_1$ output from the latch 31 and the predicted variation amount ΔM to be used till the next sample timing output from the subtracter 33, to thereby obtain a target value TM for the interpolating arithmetic operations. Namely, the adder 34 performs the operation of $$TM = M_1 + \Delta M$$

Note that in this embodiment, the target values TP and TM are not definite targets for the interpolating arithmetic operations and merely used as guidelines indicating approximate courses of the interpolation. What actually concerns the determination of specific interpolation values is a standard predicted value as will be stated below.

Figure 4:
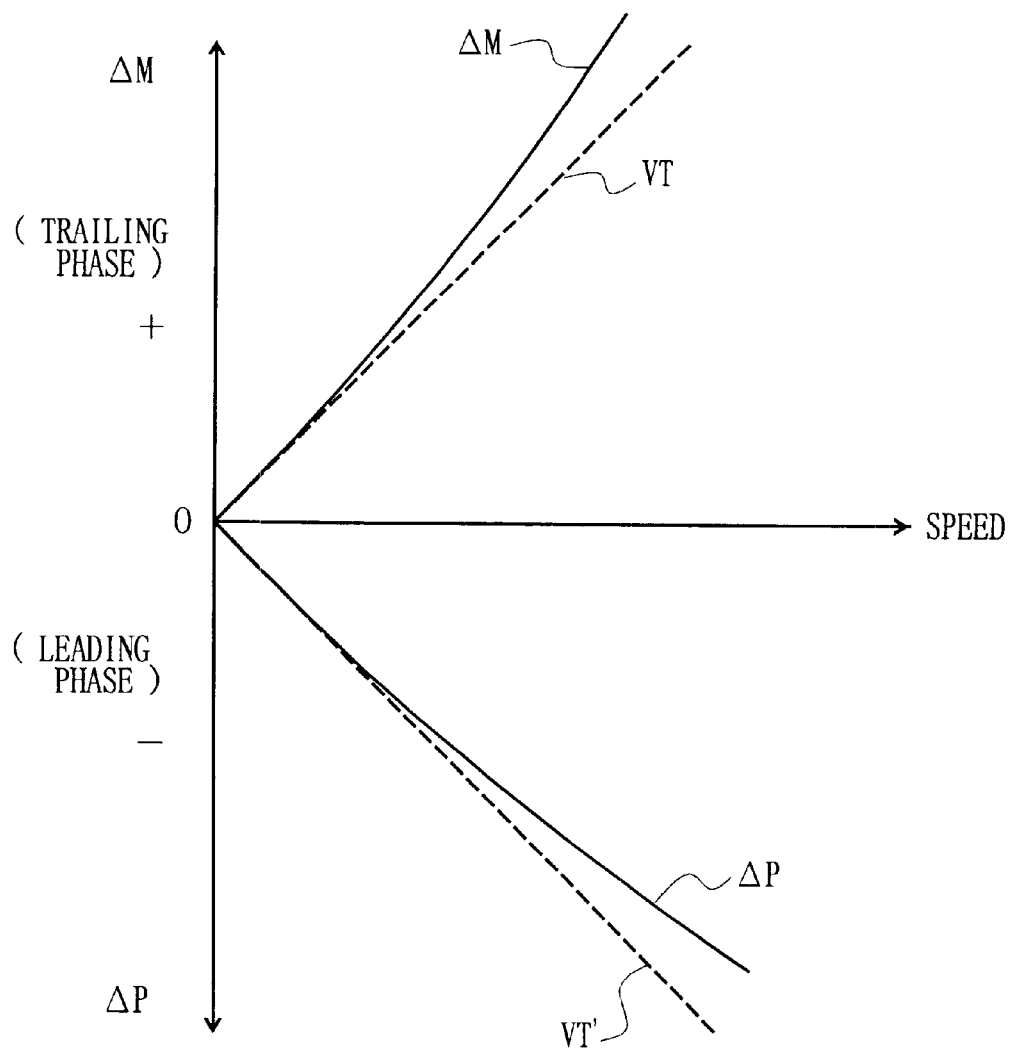
FIG. 4 is a diagram showing that characteristics of variation amounts in leading-phase and trailing-phase signals relative to a moving speed of an object of detection present nonlinearity, which is also explanatory of an improvement in the nonlinearity achieved by the present invention.

As previously noted, the phase variation amount ΔP in the phase-advancing or positive direction (or timewise compressing direction) and the phase variation amount ΔM in the phase-retreating or negative direction (or timewise stretching direction) would occur due to the Doppler effect and depends on a moving speed of the object of detection (or the number of rotations if the object of detection is a rotating member). However, these phase variation amounts ΔP and ΔM in the positive and negative directions present a non-linear characteristic relative to the moving speed rather than a linear characteristic as illustratively shown in FIG. 4. Curve ΔM depicted by solid line in a first quadrant of FIG. 4 represents an exemplary nonlinear characteristic of the variation amount ΔM in the negative direction, while curve ΔP depicted by solid line in a fourth quadrant represents an exemplary nonlinear characteristic of the variation amount ΔP in the positive direction. Namely, these variation amounts ΔP and ΔM present opposite nonlinear characteristics; one of them is exponential and the other logarithmic. Such opposite nonlinear characteristics occur due to the fact that the sampling period (alternating period) for determining the variation amounts ΔP and ΔM is compressed as the moving speed increases in the case of the leading phase and is stretched as the moving speed increases in the case of the trailing phase. Because the weights of the two variation amounts ΔP and ΔM differ from each other as the moving speed (represented by the horizontal axis of FIG. 4) increases, a significant error would result if the variation amounts are used in the interpolating arithmetic operations without being appropriately corrected and the temperature-characteristic-error compensating calculations or the like are performed using the results of the interpolating arithmetic operations therebetween. Thus, the instant embodiment is arranged to avoid such an error by correcting the nonlinear characteristics of these variation amounts ΔP and ΔM (namely, primary predicted values). Hereinafter, a value obtained by correcting the nonlinear characteristics of these variation amounts ΔP and ΔM (namely, primary predicted values) will be called a "standard predicted value" (normalized predicted value).

In the illustrated example of FIG. 2, the modified predicted value, i.e. standard predicted value VT, is determined by an arithmetic operator 30 averaging the absolute values of the variation amounts ΔP and ΔM output from the subtracters 23 and 33 as follows.

$$VT=(|\Delta P| \text{ and } |\Delta M|) \div 2$$

The thus-obtained standard predicted value VT presents a generally linear characteristic relative to the moving speed of the object of detection, as denoted by broken line in FIG. 4. The standard predicted value VT corresponds to variation amounts, i.e. predicted values, between samples that will be obtained by sampling (or latching) the detection data $P_1$ and $M_1$ of the leading and trailing phases in a predetermined standard sampling period (one period of the reference A.C. signal sin ωt), namely, predicted variation values per virtual sampling (latching) period. In other words, by converting the nonlinear characteristics of the variation amounts ΔP and ΔM into linear characteristics to determine the standard predicted value VT as shown in FIG. 4, it is possible to perform a normalized virtual phase detection, based on the predetermined standard sampling period (one alternating period of the reference A.C. signal sin ωt), while eliminating the influences of the Doppler effect when the object of detection is moving, i.e., the influences of dynamic characteristics. This is indeed a novel inventive concept proposed by the present invention. Note that when the standard predicted value VT is used in arithmetic operators 25 and 35 at later steps, plus and minus signs corresponding to the positive and negative inclinations of the individual predicted values ΔP and ΔM are attached to the standard predicted value VT. For example, the minus sign is attached to the standard predicted value VT to be used in the arithmetic operator 25 for the leading phase because the predicted value ΔP of the leading phase has a negative inclination as denoted by broken line VT'.

The standard predicted value may be determined in any other suitable manner than the above-mentioned; for example, nonlinearity conversion tables of opposite characteristics may be used for the leading and trailing phases to convert the respective predicted values ΔP and ΔM into values presenting predetermined linear characteristics, in which case the standard predicted value is generated separately for each of the leading and trailing phases. However, the first-mentioned manner of determining the standard predicted value based on calculation of the average value is very advantageous over the second-mentioned manner of using the conversion tables in that it requires only very simple arrangements. Note that the predicted values ΔP and ΔM may each be determined on the basis of a difference between two samples of the phase detection data apart from each other by more than one sample (variation amount over two or more sample cycles) rather than two successive or adjoining samples (variation amount in just one sample cycle). Further, the predicted values ΔP and ΔM may each be determined on the basis of a difference between three or more samples of the phase detection data rather than two samples.

Figure 5A:
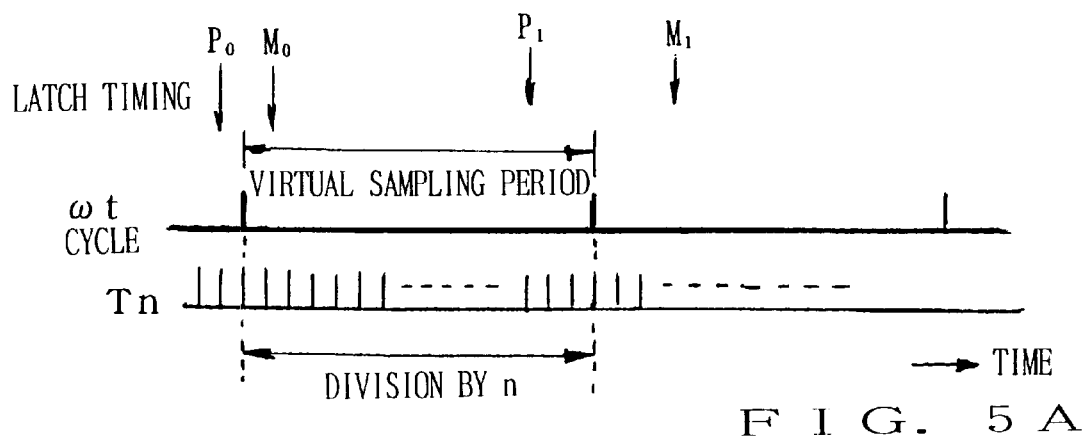
FIGS. 5A–5C are diagrams explanatory of several examples of interpolating arithmetic operations performed in the preferred embodiment.

In the described preferred embodiment of the present invention, the interpolating arithmetic operations are carried out on the basis of the above-mentioned virtual sampling (latching) period, i.e. the predetermined standard sampling period (one period or cycle of the reference A.C. signal sin ωt). Namely, as shown in FIG. 5A, one period of the exciting reference A.C. signal sin ωt (e.g., 100 μs where the reference A.C. signal is at a 10 kHz frequency) is divided by a predetermined value n. Using each divided time slot as an interpolation step, predictive interpolating arithmetic operations, consisting of n interpolation steps, are carried out sequentially with passage of time. Each interpolating clock pulse Tn defining one time slot or interpolation step has a period that is 1/n of one period of the reference A.C. signal sin ωt. If n=4,096, the interpolating clock pulses Tn have a 40.96 MHZ frequency. Assuming that the value n is equal to the modulo number of the counter 19, the same clock pulses may be used as the interpolating clock pulse Tn and as clock pulses CK to be applied to the counter 19.

In FIG. 2, the arithmetic operator 25 calculates an interpolation value (i.e., interpolation increment) AP per interpolation step, using at least the standard predicted value VT determined via the arithmetic operator 30. Basically, the interpolation value or increment AP per interpolation step can be determined by dividing, by the number of the interpolation steps, the standard predicted value VT representing the variation amount per virtual sampling period. However, if, when new detection data $P_1$ is latched into the latch 21 at generation timing of the latch pulse LP1, the immediately preceding interpolation value (interpolated result, i.e. interpolated detection data) has a discrepancy or error relative to the currently-sampled new detection data $P_1$, it is desirable that an error correcting operation based on the predictive interpolation be constantly performed while reflecting the error in the interpolation increment AP. Thus, the arithmetic operator 25 calculates every new interpolation increment AP by performing the following arithmetic operation using the currently-sampled new detection data $P_1$ output from the latch 21 and a latest interpolation value (interpolated result, i.e. interpolated detection data) PA obtained via an interpolation processing section 26.

$$Ap=\{(P_1-PA)+VT\}\div n$$

Here, "($P_1$−PA)" represents a difference between the current interpolated detection data, i.e. latest interpolation value, PA and the currently-sampled new detection data $P_1$. The standard predicted value for the next virtual sampling period is modified by adding the error to the standard predicted value VT and the thus-modified standard predicted value is divided by "n", to thereby determine the interpolation increment Ap. Here, if the variation amount ΔP has a negative inclination, the negative form of the value determined via the arithmetic operator 30 (i.e., VT' of FIG. 4) is given as the standard predicted value VT to be used in the arithmetic operator 25. Thus, the interpolation increment Ap becomes a negative value (and hence a decrement).

Similar operations occur for the trailing phase as well. Namely, the arithmetic operator 35 calculates every new interpolation increment Am by performing, at the generation timing of the latch pulse LP2, the following arithmetic operation using the standard predicted value VT, above-mentioned dividing number or divisor n, currently-sampled new detection data $M_1$ output from the latch 31 and latest interpolation value (interpolated result, i.e. interpolated detection data) MA obtained via an interpolation processing section 36.

$$Am=\{(M_1-MA)+VT\}\div n$$

Here, "$(M_1-MA)$" represents a difference between the current interpolated detection data, i.e. latest interpolation value, MA and the currently-sampled new detection data $M_1$. The standard predicted value for the next virtual sampling period is modified by adding the error to the standard predicted value VT and the thus-modified standard predicted value is divided by "n", to thereby determine the interpolation increment Am. Here, if the variation amount ΔM determined via the arithmetic operator 33 has a positive inclination, the value determined via the arithmetic operator 30 is given directly (with the positive sign unchanged) as the standard predicted value VT to be used in the above-mentioned arithmetic operation by the arithmetic operator 35.

In the interpolation processing section 26 for the leading phase, the interpolation increment Ap calculated by the arithmetic operator 25 is cumulatively added to the latest interpolation value PA every interpolation step based on the interpolation clock pulse Tn. In this way, the interpolation processing section 26 carries out the predictive interpolating arithmetic operations sequentially in accordance with the passage of time. More specifically, every interpolation step based on the interpolation clock pulse Tn, the interpolation processing section 26 goes to step 26a where it adds the interpolation increment 26a to the current interpolated detection data, i.e. latest interpolation value, PA to thereby update the interpolated detection data or latest interpolation value PA. At next step 26b, it is ascertained whether or not the value of the interpolated detection data PA has reached or exceeded the target value TP. If answered in the negative at step 26b, the interpolation processing section 26 reverts to step 26a in order to perform a further cumulative addition of the interpolation increment Ap to the interpolated detection data PA. In this way, the interpolation processing section 26 cumulatively adds the interpolation increment Ap to the latest interpolation value PA every interpolation step. Once the value of the interpolated detection data PA has reached or exceeded the target value TP, an YES determination is made at step 26b, so that the cumulative addition of the interpolation increment Ap at step 26a is temporarily stopped. The thus-temporarily-stopped addition of the interpolation increment Ap is then resumed immediately when the latch pulse LP1 is generated next. The interpolated detection data PA determined by the arithmetic operation of step 26a is latched into an interpolated output latch 27 per interpolation step in response to the interpolation clock pulse Tn. If the interpolation increment Ap is a negative value (i.e., decrement), the value of the interpolated detection data PA obtained by the addition of step 26b decreases gradually, so that there are obtained, through the predictive interpolating arithmetic operations, interpolated detection data PA shifting minutely in the positive direction. Because, in this case, the target value TP is smaller than the last-obtained latest interpolation value PA, step 26b makes a determination as to whether a relationship of "PA≦TP" has been established or not.

Similarly, in the interpolation processing section 36 for the trailing phase, the interpolation increment Am calculated by the arithmetic operator 35 is cumulatively added, at step 36a, to the latest interpolation value MA every interpolation step based on the interpolation clock pulse Tn, so as to carry out the predictive interpolating arithmetic operations sequentially in accordance with the passage of time. Once the value of the interpolated detection data MA has reached or exceeded the target value TM, an YES determination is made at step 36b, so that the cumulative addition of the interpolation increment Am at step 36a is temporarily stopped. The thus-temporarily-stopped addition of the interpolation increment Am is resumed immediately when the latch pulse LP2 is generated next. The interpolated detection data MA determined by the arithmetic operation of step 36a is latched into an interpolated output latch 37 per interpolation step in response to the interpolation clock pulse Tn. If the interpolation increment Am is a positive value, the value of the interpolated detection data MA obtained by the addition of step 36b increases gradually, so that there are obtained, through the predictive interpolating arithmetic operations, interpolated detection data MA shifting minutely in the negative direction. Because, in this case, the target value TM is greater than the last-obtained latest interpolation value MA, step 36b makes a determination as to whether a relationship of "MA≧TM" has been established or not.

Figure 5B:
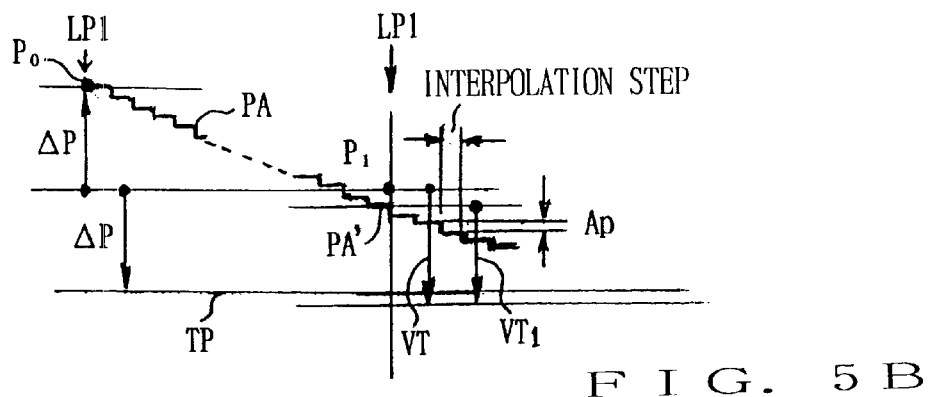

FIG. 5B is a diagram explanatory of an example of the interpolating arithmetic operations in the phase-advancing or positive direction. Once the current sample of the detection data $P_1$ is latched in the latch 21 in response to the latch pulse LP1, a difference of the currently-sampled detection data $P_1$ and last-sampled detection data $P_0$ is determined as the variation amount ΔP, and a sum $(P_1+\Delta P)$ of the currently-sampled detection data $(P_1)$ and variation amount (ΔP) is set as the target value TP. Also, a difference between the latest interpolation value PA' and the currently-sampled detection data $P_1$ detected at the generation timing of the latch pulse LP1 is added to the standard predicted value VT so that the standard predicted value VT is modified as denoted by VT1. Then, the interpolation increment (decrement) Ap is calculated on the basis of the modified standard predicted value, and interpolated detection data PA is obtained by cumulatively adding the interpolation increment (decrement) Ap to the latest interpolated PA' every interpolation step.

Figure 5C:
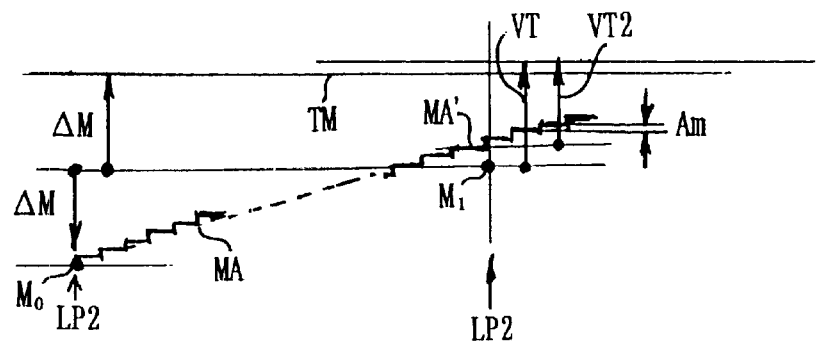

FIG. 5C is a diagram explanatory of an example of the interpolating arithmetic operations in the phase-retreating or negative direction. Once the, current sample of the detection data $M_1$ is latched in the latch 31 in response to the latch pulse LP2, a difference of the currently-sampled detection data $M_1$ and last-sampled detection data $M_0$ is detected as the variation amount ΔM, and a sum $(M_1+\Delta M)$ of the currently-sampled detection data $(M_1)$ and variation amount (ΔM) is set as the target value TM. Also, a difference between the latest interpolation value MA' and the currently-sampled detection data $M_1$ detected at the generation timing of the latch, pulse LP2 is added to the standard predicted value VT so that the standard predicted value VT is modified as denoted by VT2. Then, the interpolation increment Am is calculated on the basis of the modified standard predicted value, and interpolated detection data MA is obtained by cumulatively adding the interpolation increment Am to the latest interpolated MA' every interpolation step.

The interpolated detection data PA and MA in the phase-advancing and phase-retreating directions, output from the interpolated output latches 27 and 37, are passed to an arithmetic operator 28, where an arithmetic operation is performed to eliminate the above-mentioned error ±d in a temperature characteristic change or the like. Namely, just as the error ±d can be detected by adding together the two detection data $P_1$ and $M_1$ of the leading and trailing phases and dividing, by two, the sum of the detection data $P_1$ and $M_1$ as described earlier in relation to FIGS. 3A and 3B, the arithmetic operator 28 extracts the error ±d by adding together the two interpolated detection data PA and MA of the leading and trailing phases and dividing, by two, the sum of the interpolated detection data PA and MA as follows:

$$\pm d = (PA + MA) \div 2$$

Because the interpolated detection data PA and MA are generated, relatively densely at close time intervals, in response to a variation over time of the position-to-be-detected x through the high-precision predictive interpolation, they can indicate a fine timewise variation of the phase component θ associated with the timewise variation of the position-to-be-detected x for each fine time slot (interpolation step) shorter than one cyclic period of the reference A.C. signal sin ωt. Thus, the interpolated detection data PA and MA can be expressed equivalently as $$PA = \pm d + \theta(t)$$

$$MA = \pm d - \theta(t)$$

Accordingly, the operation performed by the arithmetic operator 28 can be expressed equivalently as $$[\{\pm d + \theta(t)\} + \{(\pm d - \theta(t))\}] \div 2 = \pm d$$

Thus, the arithmetic operator 28 can accurately detect the error ±d caused by an impedance variation resulting from a temperature characteristic change or the like even when the position-to-be-detected is moving, i.e., when the component +θ and −θ vary over time as +θ(t) and −θ(t).

Arithmetic operator 29 subtracts the error ±d determined by the operator 28 from one of the interpolated detection data of the leading and trailing phases PA or MA (PA in the illustrated example), so as to provide accurate (error-free) position detection data P from which the error ±d has been removed and which has undergone a dynamic-characteristic-compensating interpolation. Namely, $$P = PA - (\pm d)$$

This is equivalent to $$P = [\{\pm d + \theta(t)\} - (\pm d)] = \theta(t).$$

Figure 6:
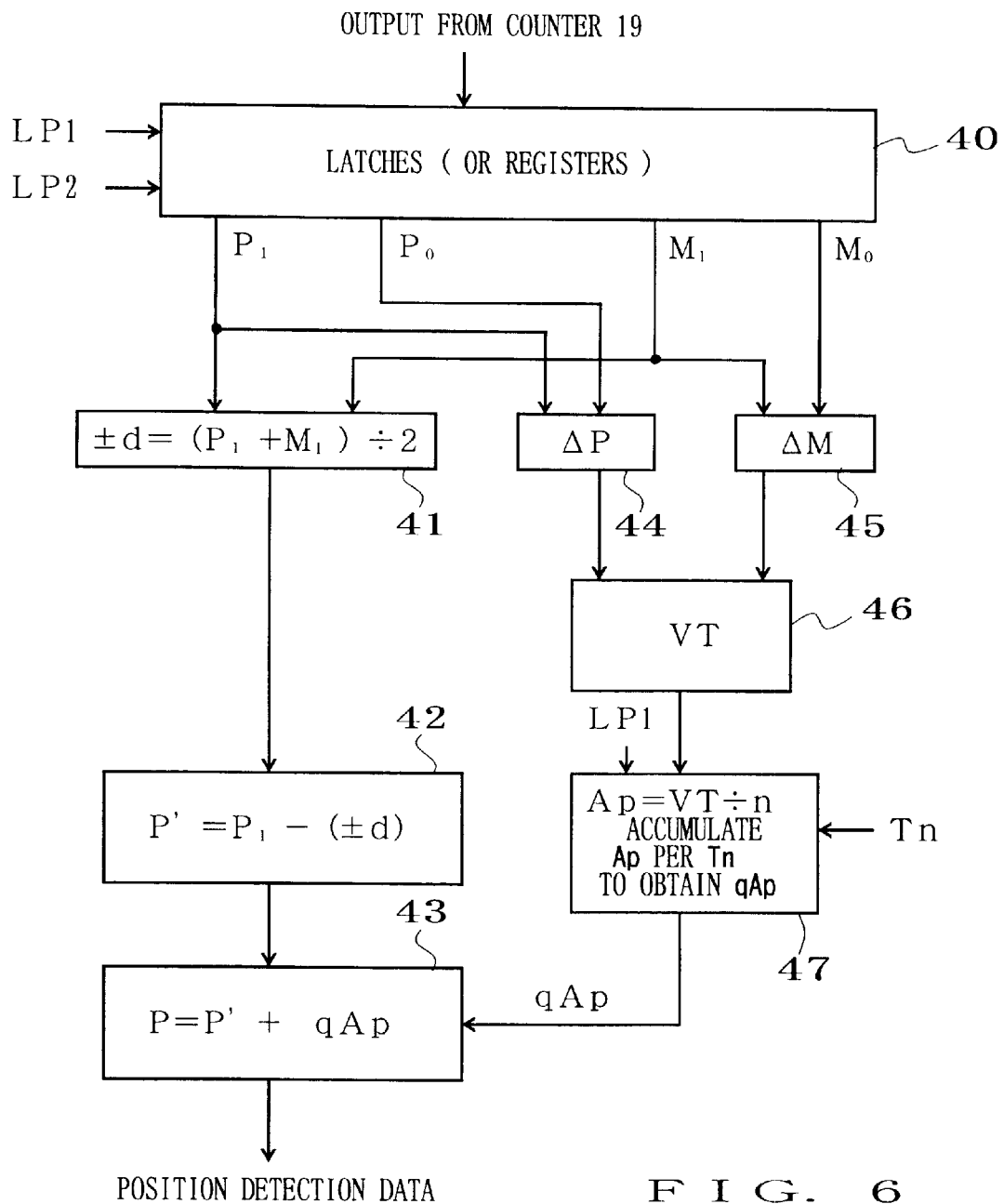
FIG. 6 is a block diagram showing a modified algorithm for interpolating arithmetic operations, which also shows another embodiment of the digital processing section of FIG. 1.

Note that the interpolating arithmetic operations in the instant embodiment may be performed in accordance with any other algorithm than the above-mentioned as exemplarily shown in FIG. 6.

In FIG. 6, a group of latches (or registers) 40 is similar to the latches 21, 22, 31 and 33 of FIG. 2, which latch the count outputs from the counter 19 in response to the latch pulses LP1 and LP2 and sequentially shift and hold the count outputs to thereby generate a plurality of samples of phase different detection data $P_0$, $P_1$, $M_0$ and $M_1$ in the phase-advancing and phase-retreating directions. Arithmetic operator 41 performs the following arithmetic operation using the current samples of the detection data $P_1$ and $M_1$ to thereby calculate an error ±d in a temperature characteristic or the like:

$$\pm d = (P_1 + M_1) \div 2$$

Arithmetic operator 42 subtracts the error ±d determined by the operator 41 from one of the detection data of the leading and trailing phases $P_1$ or $M_1$ (e.g., $P_1$), so as to provide detection data P' from which the error ±d has been removed, as expressed by $$P' = P_1 - (\pm d)$$

This detection data P' has not yet been subjected to interpolation.

Arithmetic operator 44 calculates a variation amount ΔP (e.g., $\Delta P = P_1 - P_0$) from the samples of the detection data in the phase-advancing direction, in a similar manner to the arithmetic operator 23 of FIG. 2. Arithmetic operator 45 calculates a variation amount ΔM (e.g., $\Delta M = M_1 - M_0$) from the samples of the detection data in the phase-retreating direction, in a similar manner to the arithmetic operator 33 of FIG. 2. Further, an arithmetic operator 46 modifies the variation amounts ΔP and ΔM to thereby provide a standard predicted value VT (e.g., $VT = (|\Delta P| + |\Delta M|) \div 2$), in a similar manner to the arithmetic operator 30 of FIG. 2.

Interpolating arithmetic operator 47 performs an arithmetic operation to generate an interpolation increment (or decrement) Ap by dividing the standard predicted value VT by the number of interpolation steps n (Ap=VT÷n) in response to the generation timing of the latch pulse LP1 and sequentially accumulates the interpolation increment (or decrement) Ap every interpolation step in accordance with the interpolation clock pulse Tn, to thereby obtain an interpolation value qAp. Here, "q" is a variable that sequentially increases every interpolation step like 0, 1, 2, . . . Namely, the interpolation value qAp sequentially increases like Ap, 2Ap, 3Ap, . . . and reaches the standard predicted value VT at an nth step (i.e., nAp=VT). This interpolation value qAp is reset in response to next generation of the latch pulse LP1.

Arithmetic operator 43 adds the interpolation value qAp, generated by the interpolating arithmetic operator 47, to the detection data P' determined by the arithmetic operator 42 and thereby provides interpolated position detection data P (P=P'+qAp). Whereas the preferred embodiment has been described above as obtaining interpolated position data P for the detection data of the leading phase, it should be obvious that the present invention can obtain interpolated position data M of the trailing phase, in which case the interpolating arithmetic operator 47 operates, in response to the latch pulse LP2, to generate an interpolation value qAm by accumulating an interpolation increment Am.

The circuits employed in the preferred embodiment may comprise integrated circuitry including logical operator elements, gate array etc. rather than discrete circuits, or circuitry using a digital signal processor operating by microprograms, or any other suitable high-density integrated circuitry. Further, they may be implemented by a software program using a CPU and the like. All of such embodiments are embraced in the scope of the present invention. Particularly, the digital processing section 13 of FIG. 2 can be suitably implemented using a program-based processor such as a CPU.

Variety of high-resolution rotation sensors that present a multi-cycle variation of phase angle, rather than a single-cycle variation, per rotation are known today, and if the position sensor 10 is constructed as a rotation-type sensor, the basic principles of the present invention can of course be applied to such high-resolution rotation sensors. Also known today is the technique of permitting detection of absolute rotational positions over a plurality of rotations by providing a plurality of rotational position sensors to which a rotation of a rotation shaft to be detected is transmitted at different transmission ratios. The basic principles of the present invention can be applied to such a case if position detection data of the individual rotational position sensors are determined on the basis of the phase-difference detection scheme. From the foregoing description, it should also be obvious that the basic principles of the present invention can be applied to linear position detector devices, in addition to the rotational position detector devices, where linear position detection data are obtained by the phase-difference detection scheme. Furthermore, it should be obvious that position detection signals from a plurality of the position sensors 10 may be processed time-divisionally using the common digital processing section 13.

Moreover, various additional functions may be added to the apparatus or system of the present invention; for example, the apparatus or system may additionally include a function of extracting the output data ±d from the arithmetic operator 28 or 41 as ambient-temperature detection data.

As having been described so far, the present invention can improve its response performance with respect to dynamic characteristics (detecting characteristic when the position-to-be-detected is changing over time) by generating the first and second interpolated detection data of the leading and trailing phases, densely at close time intervals, through the predictive interpolation. Thus, the timewise density or precision of the first and second interpolated detection data can be increased significantly, which can therefore eliminate the need to wait for time points where a coincidence in zero cross occurs between the two A.C. output signals as in the conventionally-known techniques and which thereby achieves an improved response capability. Further, with the arrangement that at least one standard predicted value is determined by modifying the first and second predicted values of the leading and trailing phases, the present invention can appropriately correct an error that is likely to occur in the interpolating arithmetic operations due to a possible difference in linearity of frequency transition (cyclic period transition) between the signals phase-shifted in the positive and negative directions (i.e., the signals of the leading and trailing phases), and thereby can perform the interpolating arithmetic operations with increased accuracy.

What is claimed is:

1. A position detection data generating method for use in a position detection system which produces a first A.C. output signal having an electric phase angle shifted in a positive direction in accordance with a position-to-bedetected and a second A.C. output signal having an electric phase angle shifted in a negative direction, said position detection data generating method comprising:

a first step of generating first detection data by detecting a phase difference of said first A.C. output signal from a predetermined reference phase and generating second detection data by detecting a phase difference of said second A.C. output signal from the predetermined reference phase;

a second step of providing a first predicted value on the basis of at least two samples of said first detection data and providing a second predicted value on the basis of at least two samples of said second detection data;

a third step of providing at least one standard predicted value on the basis of said first and second predicted values;

a fourth step of performing interpolation on said first detection data and said second detection data, sequentially with passage of time, using the standard predicted value, to thereby provide first interpolated detection data and second interpolated detection data; and a fifth step of, on the basis of said first and second interpolated detection data, outputting position detection data corresponding to the position-to-bedetected.

2. A position detection data generating method as claimed in claim 1 wherein said fifth step includes a step of obtaining error data contained in said first and second detection data by performing an arithmetic operation between said first and second interpolated detection data provided by said fourth step, and a step of providing interpolated position detection data indicative of the position-to-be-detected by performing an arithmetic operation to remove the error data from one of said first and second interpolated detection data.

3. A position detection data generating method as claimed in claim 1 wherein said third step provides the standard predicted value by modifying said first and second predicted values.

4. A position detection data generating method as claimed in claim 1 wherein said third step determines the standard predicted value by averaging said first and second predicted values.

5. A position detection data generating method as claimed in claim 1 wherein said third step converts at least one of said first and second predicted values using a predetermined table to thereby determine the standard predicted values corresponding to said at least one of said first and second predicted values.

6. A position detection data generating method as claimed in claim 1 wherein when a new sample of said first detection data has been provided by said first step, said fourth step modifies said standard predicted value in accordance with a difference between a latest value of said first interpolated detection data and a value of the new sample of said first detection data and then performs the interpolation on said first detection data using the modified standard predicted value, and wherein when a new sample of said second detection data has been provided by said first step, said fourth step modifies said standard predicted value in accordance with a difference between a latest value of said second interpolated detection data and a value of the new sample of said second detection data and then performs the interpolation on said second detection data using the modified standard predicted value.

7. A position detection data generating method as claimed in claim 1 wherein said fourth step determines a first target value on the basis of the new sample of said first detection data and said first predicted value and performs an interpolating arithmetic operation on said first interpolated detection data using said first target value as a first target interpolation value, and wherein said fourth step also determines a second target value on the basis of the new sample of said second detection data and said second predicted value and performs an interpolating arithmetic operation on said second interpolated detection data using said second target value as a second target interpolation value.

8. A machine-readable storage medium containing a group of instructions to cause a machine to perform the method as defined in claim 1.

9. A machine-readable storage medium containing a group of instructions to cause a machine to perform the method as defined in claim 2.

* * * * *